United States Patent Office 3,463,765
Patented Aug. 26, 1969

3,463,765
VINYL CHLORIDE POLYMER COMPOSITIONS
James A. Cote, Arlington Heights, Ill., and Thomas E. Ferington, Sandy Spring, and Razmic S. Gregorian, Silver Spring, Md., assignors to W. R. Grace & Co., New York, N.Y., a corporation of Connecticut
No Drawing. Filed Dec. 21, 1967, Ser. No. 692,297
Int. Cl. C08f 47/12, 45/00, 29/18
U.S. Cl. 260—85.5                                    4 Claims

ABSTRACT OF THE DISCLOSURE

This invention relates to improving the orientation and shrink characteristics of polyvinyl chloride homopolymers and copolymers by adding to the polymeric material a minor amount, 0.1 to 25% by weight of the polymeric material of an additive selected from the group consisting of nitrilotriacetic acid, nitrilotriacetonitrile and iminodiacetic acid dialkyl esters.

---

Polyvinyl chloride is a polymer of great commercial importance because of its low cost. Of the production of polyvinyl chloride homopolymers and copolymers, approximately one-half goes into making film. The orientation of polyvinyl chloride homopolymers and copolymers to make film however has many drawbacks. For example rigid (unplasticized) polyvinyl chloride on orientation in the region where maximum elongation is obtained, develops too high a shrink tension causing tear of the film when packaging articles or a crumbling of the article itself during the wrapping and shrinking operation. Also the maximum percent elongation obtainable throughout the whole elongation temperature range is too low, i.e., of the order of about 200%. This is particularly true at the orientation temperature range where the shrink tension of the polyvinyl chloride film is at an optimum level. Thus, because of the low percent elongation obtainable, it is necessary to start off with a thin film to get down to a final film thickness of 0.5 to 1 mil. This results in a low throughput in the plant. Additionally, the orientation temperature cannot be raised to lower the shrink tension because at higher temperatures where the shrink tension falls off, the percent elongation is also reduced. This drawback is partially overcome by the addition of plasticizers to the polymeric material thereby reducing the shrink tension obtained on orientation. However, the resultant plasticized product has the drawback that it shrinks back even at room temperature due to the plasticizer acting as an internal lubricant.

One object of the instant invention is to obtain a higher percent elongation of polyvinyl chloride homopolymers and copolymers on orientation. Another object of the instant invention is to obtain a lower and more workable shrink tension of the polymeric material in the range whereat the maximum percent elongation is obtained. Other objects will become apparent from a reading hereinafter.

The above objects are obtained by the practice of the instant invention which comprises adding a minor amount 0.1 to 25% by weight of polyvinyl chloride homopolymer or copolymer, of an additive selected from the group consisting of nitrilotriacetic acid, nitrilotriacetonitrile and iminodiacetic acid dialkyl esters wherein the alkyl group contains 1 to 10 carbon atoms to the polymeric material prior to orientation.

The additives of the instant invention are operable with both plasticized and unplasticized polyvinyl chloride homopolymers and copolymers. In the case of plasticized polyvinyl chloride homopolymers and copolymers, it is oftentimes possible to reduce the amount of plasticizer necessary for orientation.

The amount of additive employed in the instant invention is in the range of 0.1 to 25% by weight of the polyvinyl chloride homopolymer or copolymer, preferably in the range 1–10% by weight.

The general procedure for practicing the instant invention is to blend the additive (preferably in particulate form where it is a solid) with polyvinyl chloride homopolymer or copolymer, polyvinyl chloride stabilizer and any other usual processing aids including dyes and pigments on a roll mill at room temperature until a homogeneous blend is obtained. Thereafter the mixture is charged to a two roll mill at a temperature above the melting point of the polymeric material and rolled thereon until the mass is homogeneously blended. The blended mass is then removed from the two roll mill, cooled and cut into pieces which are thereafter pressed into sheet on a hydraulic press at a temperature above the melting point of the polymeric material. Thereafter the pressed sheets are oriented either by the trapped bubble technique or on a tenter frame at temperatures in the range 80–175° C. to obtain an elongation ratio in the range 2.5–4×.

The following examples will better explain but expressly not limit the instant invention.

The shrink tension (p.s.i.) was measured on an Instron Tensile Tester at a shrink temperature in the range 80–150° C. until a maximum force was recorded. The strink tension is the forced per unit cross sectional area exerted by a constrained film at any given temperature.

The percent free shrink (linear) =

$$\frac{\text{original length} - \text{final length}}{\text{original length}} \times 100$$

where the final length is the length of the sample measured at room temperature after the sample has been immersed in a bath at the shrink temperature for 15 seconds.

$$\text{The elongation ratio} = \frac{\text{final length}}{\text{original length}}$$

The percent elongation = 100× the elongation ratio.

Unless otherwise noted all parts and percentages are by weight.

Example 1

Two parts of nitrilotriacetic acid commercially available from Hampshire Chemical Co., Nashua, N.H., 3½ parts dibutyl tin isooctyl thioglycolate (PVC stabilizer) and 100 parts of polyvinyl chloride were charged to a glass jar, placed on rollers and dry blended at room temperature for 1 hour. The mixture was removed from the jar and charged to a two roll mill wherein it was homogeneously blended at 185° C. for 10 minutes. The thus blended mixture was removed from the two roll mill, cut into 1″ squares of approximately ⅛″ thickness and cooled to room temperature. The squares were then pressed into 10 mil thick sheets 7″ in diameter on a hydraulic press at 195° C. and 40,000 p.s.i. The thus pressed sheets were then cut into 4½″ squares and oriented to an elongation ratio of 3× on a laboratory tenter frame at various orientation temperatures in the range 121–176° C. at a stretching rate of 0.945 in./sec. The thus oriented sheets were cut into strips 1″×6″×1 mil thick and characterized for shrink tension and percent free shrink (linear). The shrink tension tests were measured on an Instron Tensile Tester at shrink temperatures in the range 80–150° C. until a maximum force was recorded. The percent free shrink (linear) was measured in a silicone oil bath for 15 seconds at various temperatures ranging from 80–150° C. A control run consisting of 100 parts by polyvinyl chloride and 3½ parts of dibutyl tin isooctyl thioglycolate was mixed as in Example 1 and oriented to an elongation ratio of 2× at 97° C. The comparative results are shown in Table I.

into 4½" squares and oriented on a laboratory tenter frame at various orientation temperatures in the range

TABLE I

| Shrink temp. (° C.) | Orientation temperature ° C. | | | | | | | |
|---|---|---|---|---|---|---|---|---|
|  | 137° C. | | 149° C. | | 163° C. | | 176° C. | |
|  | Shrink tension (p.s.i.) | Linear percent shrink | Shrink tension (p.s.i.) | Linear percent shrink | Shrink tension (p.s.i.) | Linear percent shrink | Shrink tension (p.s.i.) | Linear percent shrink |
| 80 | 33 |  | 46 | 7 | 65 | 5 | 34 | 5 |
| 90 | 26 |  | 75 | 13 | 32 | 17 | 10 | 17 |
| 100 | 19 |  | 100 | 23 | 28 | 19 |  | 20 |
| 110 | 0 |  | 80 | 28 | 32 | 18 | 17 | 19 |
| 120 | 39 |  | 76 | 27 | 23 | 17 | 11 | 19 |
| 130 | 29 |  | 97 | 27 | 27 | 20 | 31 | 21 |
| 140 | 18 |  | 61 | 31 | 34 | 17 | 49 | 27 |
| 150 | 37 |  | 55 | 38 | 34 | 23 | 18 | 30 |
| Control (2× at 97° C.) | 500 |  | 400 | 40 | 288 |  | 105 | 26 |

Example 2

Example 1 was repeated except that 2 parts by weight of nitrilotriacetonitrile, commercially available from Hampshire Chemical Co., Nashua, N.H. was substituted for the two parts of nitrilotriacetic acid. The results are shown in Table II.

79°–177° C. The maximum elongation without tearing of the film is shown below in Table III as a function of temperature. A control run of the same commercially available polyvinyl chloride with 3½ parts of dibutyl tin isooctyl thioglycolate was blended, homogenized and oriented under the same conditions as the compositions contain-

TABLE II

| Shrink Temp. (° C.) | Orientation Temperature ° C. | | | | | | | | | |
|---|---|---|---|---|---|---|---|---|---|---|
|  | 121° C. | | 135° C. | | 149° C. | | 163° C. | | 176° C. | |
|  | Shrink tension (p.s.i.) | Linear percent shrink | Shrink tension (p.s.i.) | Linear percent shrink | Shrink tension (p.s.i.) | Linear percent shrink | Shrink tension (p.s.i.) | Linear percent shrink | Shrink tension (p.s.i.) | Linear percent shrink |
| 80 | 196 | 17 |  | 19 | 253 | 11 | 122 | 13 | 174 | 7 |
| 90 | 400 | 21 | 244 | 23 | 264 | 20 | 127 | 23 | 176 | 10 |
| 100 | 316 | 21 | 240 | 23 | 184 | 21 | 147 | 22 | 230 | 10 |
| 110 | 293 | 28 | 228 | 22 | 202 | 20 | 146 | 20 | 129 | 13 |
| 120 | 97 | 27 | 213 | 23 | 181 | 21 | 110 | 22 | 116 | 20 |
| 130 | 133 | 35 | 294 | 29 |  | 23 | 80 | 25 | 174 | 29 |
| 140 | 135 | 44 | 220 | 33 | 161 | 32 |  | 27 | 129 | 30 |
| 150 |  | 57 | 258 | 38 | 147 | 36 | 74 | 34 | 126 | 32 |
| Control (2× at 97° C.) |  |  | 500 | 37 | 400 | 40 | 288 |  | 105 | 26 |

As can be seen from Tables I and II, the shrink tensions have been sharply reduced by the inclusion of nitrilotriacetic acid as shown in Table I and appreciably reduced by the inclusion of nitrilotriacetonitrile as shown in Table II. The following examples show the orientation behavior afforded by the addition of the additives of the instant invention to polyvinyl chloride.

ing the additives. The control run results are also shown in Table III.

TABLE III

| Composition | Orientation Temp., ° C. | | | | | | | |
|---|---|---|---|---|---|---|---|---|
|  | 79 | 93 | 107 | 121 | 135 | 149 | 163 | 177 |
| Stabilized PVC untreated | 1.4X | 2.5X | 2X | 1.8X | 1.7X | 1.5X | 1.5X | 2X |
| Stabilized PVC+2% nitrilotriacetic acid | 1.4X | 2.5X | 2X | 1.8X | 2.2X | 3X | 3.2X | 3X |
| Stabilized PVC+2% nitrilotriacetonitrile | 1.4X | 2.5X | 2X | 2.0X | 2.5X | 3X | 3.2X | 3X |

Example 3

Blends of 100 parts of commercially available polyvinyl chloride, 5 parts of dibutyl tin isooctyl thioglycolate (PVC stabilizer) and either 2 parts of nitrilotriacetic acid or 2 parts of nitrilotriacetonitrile were charged to a glass jar, placed on rollers and dried blended at room temperature for 1 hour. The mixtures were removed from the jars and charged to a 2 roll mill where each was homogeneously blended at 185° C. for 10 minutes. The thus blended mixtures were removed from the 2 roll mill, cut into 1" squares of approximately ⅛" thickness and cooled at room temperature. The squares were then pressed into 10 mil thick sheets 7" in diameter on a hydraulic press at 195° C. and 40,000 p.s.i. The thus pressed sheets were then cut From Table III it can be seen that at temperatures above about 121° C., both additives are substantially effective in increasing elongation before tearing. Nitrilotriacetonitrile is effective at slightly lower temperatures than nitrilotriacetic acid. This similarity of activity is surprising since nitrilotriacetonitrile dissolves completely in the molten resin while nitrilotriacetic acid is mainly insoluble and is visible as a fine powder in the blend.

The polyvinyl chloride homopolymer and copolymer compositions used in combination with the additives of the instant invention may, if desired, include such additional well known additives as antioxidants, fillers, pigments, dyes antistatic agents, extending oils, plasticizers, tackifiers and the like within the scope of this invention. Such additives are usually but not necessarily added to the polymer composition by preblending prior to or during the compounding step. Operable fillers would include carbon black, clay, silica, alumina, carbonates, oxides, hydroxides, silicates, diatomaceous earth, talc, kaolin, barium sulfate, calcium sulfate, calcium carbonate, and the like. Said additives may be present up to 200 parts per 100 parts of polymer by weight and preferably 0.05–100 parts on the same basis.

Although the examples in the instant invention are directed to polyvinyl chloride homopolymers, the invention is also operable with copolymers of vinyl chloride with vinylidene chloride, vinyl acetate, acrylonitrile and olefins such as ethylene, propylene, isobutylene and the like.

Example 4

Example 1 was repeated except that 2 parts of iminodiacetic acid diethyl ester was substituted for the 2 parts of nitrilotriacetic acid. The behavior on orientation was measured and shrink properties of the final film was observed. The iminodiacetic acid diethyl ester functioned to increased ease and extent of orientation (compared to a control of 100 parts polyvinyl chloride and 3 parts stabilizer) and reduced shrink tension to approximately the same extent as nitrilotriacetic acid and nitrilotriacetonitrile.

What is claimed is:

1. A composition consisting essentially of a polymeric material selected from the group consisting of polyvinyl chloride and vinyl chloride copolymers and 0.1 to 25% by weight of the polymeric material of an additive selected from the group consisting of nitrilotriacetic acid, nitrilotriacetonitrile and iminodiacetic acid dialkyl esters wherein the alkyl group contains 1 to 10 carbon atoms.

2. The composition according to claim 1 wherein the vinyl chloride copolymer is a copolymer of vinyl chloride with a member of the group consisting of vinyl acetate, vinylidene chloride, acrylonitrile, ethylene, propylene and isobutylene.

3. The process of improving the orientation and shrink characteristics of a member of the group consisting of polyvinyl chloride and vinyl chloride copolymers which comprises blending with said group member 0.1 to 25% by weight of the group member of an additive selected from the group consisting of nitrilotriacetic acid, nitrilotriacetonitrile and iminodiacetic acid dialkyl esters wherein the alkyl group contains 1 to 10 carbon atoms and thereafter orienting the blend at temperatures in the range 79–180° C.

4. The process according to claim 3 wherein the vinyl chloride copolymer is a copolymer of vinyl chloride with a member of the group consisting of vinyl acetate, vinylidene chloride, acrylonitrile, ethylene, propylene and isobutylene.

References Cited

UNITED STATES PATENTS 2,917,477   12/1959   Suen et al.

HARRY WONG, JR., Primary Examiner

U.S. Cl. X.R.

260—41, 45.7, 87.1, 87.5, 87.7, 92.8